Oct. 12, 1965     G. D. SANDERSON     3,211,014

REVERSIBLE MECHANICAL DRIVE

Filed Oct. 25, 1963

United States Patent Office 3,211,014
Patented Oct. 12, 1965

3,211,014
REVERSIBLE MECHANICAL DRIVE
George Douglas Sanderson, Frimley, England, assignor to Southern Instruments Limited, Camberley, England, a British company
Filed Oct. 25, 1963, Ser. No. 319,025
Claims priority, application Great Britain, Nov. 2, 1962, 41,615/62
7 Claims. (Cl. 74—207)

The invention relates to reversible mechanical drives and particularly, but not exclusively, to a reversible drive for a tape recorder.

This facility is often provided upon a tape recorder in order to wind the tape quickly from either of the spools to the other one independently of the constant speed tape transport means, so that either the tape may be re-wound for quickly replaying, or it may be moved quickly either forwards or backwards to any desired position on the tape.

Heretofore, the reversing process has been carried out by a system of links or reversing pulleys, and an object of the present invention is to provide a reversing drive which is simpler in construction and more economic to manufacture.

The present invention consists in a reversible mechanical drive comprising a reversible electric motor, and input wheel driven by the motor, a lever-like member pivotable about the axis of rotation of the input wheel and carrying an idler wheel which bears upon and is driven by the said input wheel, the lever-like member frictionally engaging the input wheel or other member rotatable with the wheel so as to cause the lever-like member to be urged into either of two alternative positions, depending upon the direction of rotation of the motor, in each of which positions idler wheel engages and drives one of two alternative output wheels.

The invention further consists in a drive as set forth in the preceding paragraph, in which the idler wheel is urged in the direction of the input wheel by spring means.

Figure 2:
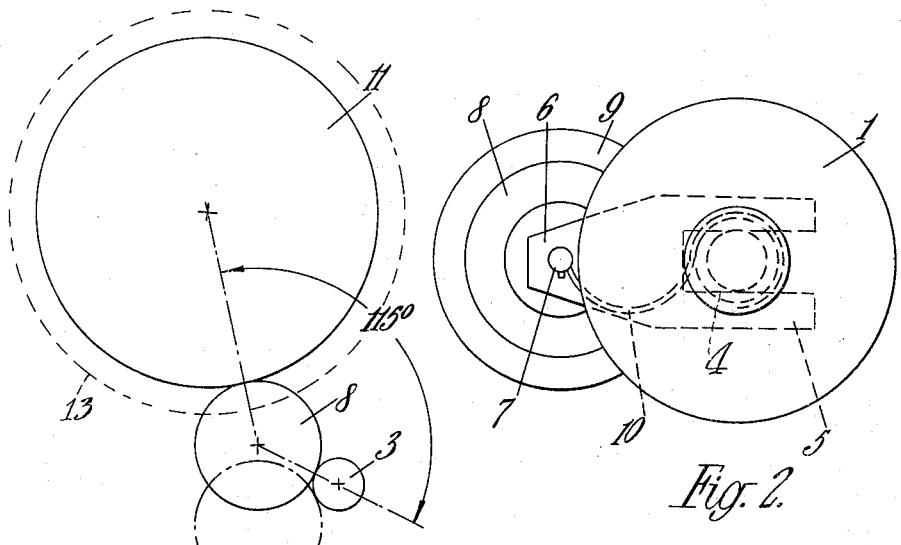
Figure 3:
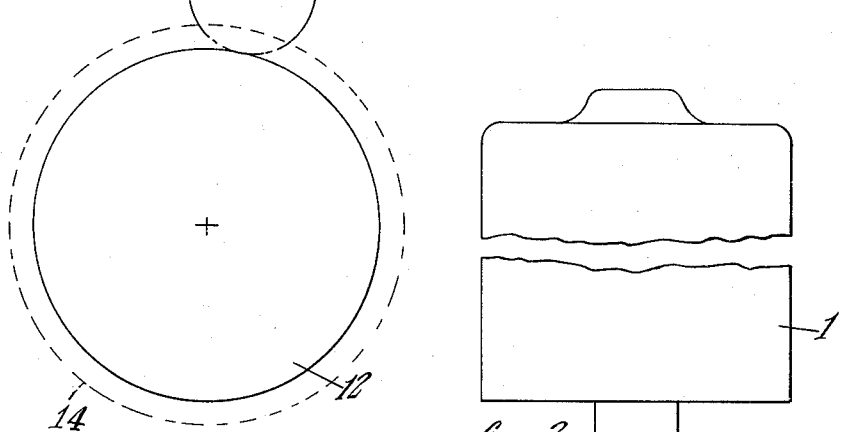
Figure 1:
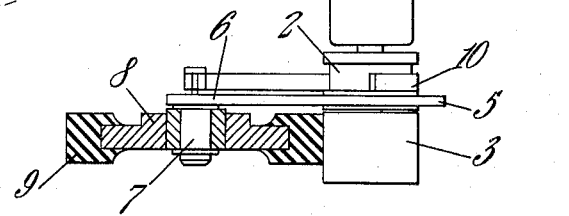

The accompanying drawing shows, by way of example only, one embodiment of the invention, adapted for use with a telephone answering device employing a magnetic tape recorder and reproducer, in which:

FIGURE 1 is a part side elevation, partly in section, of the drive;
FIGURE 2 is a plan view of FIGURE 1; and
FIGURE 3 is a diagrammatic representation of the drive.

The drive comprises a reversible electric motor 1 having a shaft to which is attached a fixed input wheel or bush 3, and a free bearing 2 having two opposed slots 4 in which the forked end 5 of a lever 6 slidably fits. To the other end of the lever 6 is fastened a pin 7 on which there is freely mounted an idler wheel 8 having a rubber tyre 9 which bears upon the bush 3. A spring 10 is fastened at one end around the upper end of the 7 and at the other end around an annular recess in the bearing and urges the tyre 9 into contact with the bush 3.

The idler wheel 8 is arranged to make contact either with an output wheel 11 or an output wheel 12 depending upon the direction of rotation of the shaft of the electric motor, the lever-like member 6 swinging from one side to the other during the reversing process, under the influence of the slight frictional forces between the motor shaft and the bearing 2 and between the lever 6 and the wheel 8, which are sufficient to urge the wheel 8 in the direction of rotation of the motor.

The shaft of the motor is positioned in relation to the output wheels in such a manner that when the idler wheel engages either of the wheels the angle subtended at the idler pin by the arc between the motor shaft and the axis of the output wheel is approximately 115°.

In operation, the action is for the idler wheel to tend to move into more intimate contact with the output wheel by servo action, that is to say, by the tendency for the bush 3 to roll the idler wheel 8 more deeply into the gap between the bush 3 and the output wheel 11.

The wheels 11 and 12 can conveniently be mounted upon shafts carrying the feed and take-up spools 13 and 14 (FIGURE 3) of a tape recorder.

Electrical control of the selection of two alternative functions requiring a motor drive may be provided simply by reversing the direction of rotation of the motor.

If, as in a tape recorder, the two drives are in different directions, the only components required to drive two output wheels connected directly, for example, with spools, are the motor and spring loaded idler wheel. The system is therefore very economical in this application, avoiding the use of solenoids or lever mechanisms to engage the separate drives for forward and reverse spooling of the tape.

The drive incorporates a speed decrease or increase determined by the ratio of the diameters of the input and output wheels. This need not necessarily be the same for both spools, so long as an engagement angle in the region of 115° is retained in both cases.

Although the drive has been described more particularly in reference to a tape recorder, and especially a tape recorder incorporated in a telephone answering device where the changes in function are initiated electrically, it is to be understood that the reversing drive can be usefully employed in other circumstances and that details for carrying the invention into effect may be varied without departing from the scope of the invention.

I claim:

1. A reversible mechanical drive comprising a reversible electric motor, an input wheel operatively connected to said motor for rotation thereby, a lever-like member mounted for pivotal movement about the axis of rotation of said input wheel, an idler wheel mounted upon said lever-like member so as to bear upon, and be driven by, said input wheel, frictional engagement means causing the level-like member to be urged alternatively in one direction of rotation or the other depending upon the direction of rotation of the electric motor, a first output wheel positioned for operative driving engagement with said idler wheel when said lever-like member is urged in said one direction of rotation, and a second output wheel positioned for operative driving engagement with said idler wheel when said lever-like member is urged in said other direction of rotation.

2. A reversible mechanical drive comprising a reversible electric motor, an input wheel operatively connected to said motor for rotation thereby, a lever-like member mounted for pivotal movement about the axis of rotation of said input wheel, an idler wheel mounted upon said lever-like member, spring means urging said idler wheel into operative driving engagement with said input wheel, frictional engagement means causing the lever-like member to be urged alternatively in one direction of rotation or the other depending upon the direction of rotation of the electric motor, a first output wheel positioned for operative driving engagement with said idler wheel when said lever-like member is urged in said one directon of rotaton, and a second output wheel positioned for operative driving engagement with said idler wheel when said lever-like member is urged in said other directon of rotaton.

3. A reversible mechanical drive comprising a reversible electric motor, a shaft mounted for rotation by said motor, an input wheel secured to said shaft, a bearing freely mounted on said shaft, lever mounted on said bearing, whereby said lever is urged under the influence of slight frictional forces between said bearing and said shaft alternatively in one direction of rotation or the other depending upon the direction of rotation of the electric motor, an idler wheel mounted upon said lever so as to bear upon, and be driven by, said input wheel, a first output wheel positioned for operative driving engagement with said idler wheel when said lever is urged in said one direction of rotation, and a second output wheel positioned for operative driving engagement with said idler wheel when said lever is urged in said other direction of rotation.

4. A tape recorder which includes a reversible electric motor, an input wheel operatively connected to said motor for rotation thereby, a lever mounted for pivotal movement about the axis of rotation of said input wheel, an idler wheel mounted upon said lever so as to bear upon, and be driven by, said input wheel, frictional engagement means causing the lever to be urged alternatively in one direction of rotation or the other depending upon the direction of rotation of the electric motor, a first output wheel positioned for operative driving engagement with said idler wheel when said lever-like member is urged in said one direction of rotation, a second output wheel positioned for operative driving engagement with said idler wheel when said lever-like member is urged in said other direction of rotation, a tape feed spool arranged to be driven by said first output wheel, and a tape take-up spool arranged to be driven by said second output wheel.

5. A reversible mechanical drive comprising a reversible electric motor, an input wheel operatively connected to said motor for rotation thereby, a lever mounted for pivotal movement about the axis of rotation of said input wheel, an idler wheel mounted upon said lever so as to bear upon, and be driven by, said input wheel, a first output wheel mounted for rotation about a first axis, and a second output wheel mounted for rotation about a second axis, the arrangement being such that when said electric motor is energized to rotate in one direction the idler wheel is urged into operative driving engagement with said first output wheel, and when said electric motor is energized to rotate in the opposite direction the idler wheel is urged into operative driving engagement with said second output wheel.

6. A reversible mechanical drive comprising a reversible electric motor, an input wheel operatively connected to said motor for rotation thereby, a lever mounted for pivotal movement about the axis of rotation of said input wheel, an idler wheel mounted upon said lever so as to bear upon, and be driven by, said input wheel, first and second output wheels mounted for rotation about first and second axis respectively, frictional engagement means causing the idler wheel to be urged alternatively in one direction of rotation or the other depending upon the direction of rotation of the electric motor, in order to establish operative driving engagement with said first or said second output wheel, the angle subtended at the axis of the idler wheel by the arc between the axis of the input wheel and the axis of the output wheel being about 115° when the idler wheel is in driving engagement with either of said two output wheels.

7. A reversible mechanical drive comprising a reversible electric motor, a shaft arranged for rotation by said motor, an input wheel, secured on said shaft, a bearing freely mounted on said shaft, a lever slidably engaging said bearing, whereby said lever is urged under the influence of slight frictional forces between said bearing and said shaft alternatively in one direction of rotation or the other, depending upon the direction of rotation of the electric motor, an idler wheel mounted for rotation about an axis upon said lever, spring means urging said idler wheel toward said bearing and into operative driving engagement with said input wheel, a first output wheel mounted for rotation about a first axis and positioned for operative driving engagement with said idler wheel when said lever is urged in said one direction of rotation, and a second output wheel mounted for rotation about a second axis and positioned for operative driving engagement with said idler wheel when said lever is urged in said other direction of rotation, the angle subtended at the axis of the idler wheel by the arc between the axis of the input wheel and either said first or second axis being approximately 115° when the idler wheel is in driving engagement with said first or second output wheel respectively.

References Cited by the Examiner
UNITED STATES PATENTS

| | | | |
|---|---|---|---|
| 242,307 | 5/81 | Hammond | 74—208 |
| 579,663 | 3/97 | Leidgen | 74—213 |
| 1,787,571 | 1/31 | Edwards | 74—202 |
| 2,823,546 | 2/58 | Barrett | 74—207 X |

DON A. WAITE, *Primary Examiner.*